United States Patent [19]
Coates et al.

[11] 3,767,926
[45] Oct. 23, 1973

[54] FIELD EMISSION SCANNING MICROSCOPE DISPLAY

[75] Inventors: Vincent J. Coates, Los Altos; Leonard M. Welter, Saratoga, both of Calif.

[73] Assignee: American Optical Corporation, Southbridge, Mass.

[22] Filed: May 8, 1972

[21] Appl. No.: 251,125

[52] U.S. Cl............. 250/310, 250/311, 178/DIG. 3
[51] Int. Cl. ............................................ H01j 37/26
[58] Field of Search ............... 250/49.5 A, 49.5 PF, 250/310, 311; 178/DIG. 3

[56] References Cited
UNITED STATES PATENTS
3,309,461  3/1967  Deutsch.......................... 178/DIG. 3
2,940,005  6/1960  Toulon........................... 178/DIG. 3

OTHER PUBLICATIONS
"Pulse and Digital Circuits" Millman et al., McGraw Hill, 1956 pp. 515–517.

Primary Examiner—James W. Lawrence
Assistant Examiner—B. C. Anderson
Attorney—William C. Nealon et al.

[57] ABSTRACT

A field emission scanning microscope display system wherein a field emission gun generates a beam of charged particles which impinge upon a specimen to be investigated. A detector of the scintillation type produces an image signal relative to the impingement of the beam on the specimen. The image signal is appropriately amplified and conducted to a signal grid of a television type viewing monitor. A control unit synchronously deflects the microscope beam and the electron beam of the viewing tube in a predetermined pattern. The pattern is selected to have preferably a four-to-one interlacing and the interlacing sequence is selected so as to render the image formed on the viewing tube substantially stationary in a normal viewing mode.

7 Claims, 3 Drawing Figures 3,767,926

FIELD EMISSION SCANNING MICROSCOPE DISPLAY

BACKGROUND OF THE INVENTION

The features of the applicants' invention are subject to a wide range of application, however, they are especially suited for use in a field emission scanning microscope display system and will therefore be particularly described in that connection.

One of the very significant advantages of scanning electron microscope systems involves the ability to directly view the specimen on a cathode ray tube-type monitor. This real time viewing of the specimen permits the practitioner to gain much valuable information even though the full resolution of the device may only be achievable on a photographic record of the image. In scanning electron microscopes of other than the field emission cathode type, the intensity of the beam is severely limited and thus the signal generated from the surface of the specimen by secondary electrons, reflected electrons, or other emitted particles is of a concomitantly low value. To enable real time viewing on a cathode ray tube, it is essential that a slow mode scanning of the specimen and the tube be utilized to assure the necessary signal-to-noise ratio for intelligible transmission of information.

With the advent of the field emission type scanning electron microscope, the achievable high beam intensity permits rapid scanning of the specimen and the monitor in a manner similar to normal television practices. The user may comfortably view the image display on a video monitor without the use of extremely high persistence screens and the resultant loss in viewing information and resolution. In a slow scan microscopy system, the same ease of viewing and information would only be attainable through the use of an ancillary video-type tape reproduction system.

The raster of the monitor appears and is entirely similar to that of the normal television receiver system. In the United States, the accepted and approved television standards specify a 525 line scanning system having a two-to-one interlace ratio. While 525 lines are entirely adequate at a normal viewing distance for TV reception, to achieve line-free photographs and better resolution as in scanning electron miscroscopy systems, it is necessary to go to a higher number of scanning lines. The higher number of lines enormously expands the required bandwidth of the display system and significantly increases both its cost and complexity.

It is, therefore, an object of this invention to provide and improved field emission scanning microscopy display system.

Another object of the invention is to provide a scanning microscopy display system having minimum bandwidth requirements. Yet another object of the invention is to provide a scanning microscopy display system permitting comfortable and normal viewing by the operator.

SUMMARY OF THE INVENTION

Briefly, the applicants' invention contemplates a field emission scanning microscope display system. A field emission gun generates a beam of charged particles which are accelerated and focused to impinge upon a specimen undergoing investigation. A detector suitably located with respect to the specimen produces an image signal relative to the impingement of the beam on the specimen. A viewing tube operatively associated with the detector displays an image of the specimen upon a sensitized face of the tube. The image is produced by modulation of the viewing tube electron beam in accordance with the image signal. A control unit synchronously deflects the charged particle beam as well as the viewing tube beam in a predetermined scanning pattern. The pattern is selected to have at least a three-to-one interlacing. The sequence of interlacing with respect to the separate fields making up individual frames of the picture is selected to render the viewing tube image sustantially stationary in a normal operator viewing mode.

Since the bandwidth is proportional to the square of the number of picture elements, approximately doubling the number of lines to achieve the necessary resultion, necessitates a four-to-one increase in bandwidth. To limit this bandwidth requirement,realizing that it is also directly proportional to the number of frames per cycle (a frame comprising a complete raster scan) the interlace ratio was increased from a normal two-to-one to a four-to-one, thus reducing the bandwidth by one-half. Appropriate selection of viewing tube persistency as well as the normal physiological persistency of the eye permits increase of the interlace ratio without derogation of the viewing image.

When viewing the image on the viewing tube with an interlace ratio greater than two-to-one, as, for example, a four-to-one ratio, it is found that a normal sequential field scanning pattern produces a cascading effect to the eye of the observer. The visual, physiological, and psychological factors producing this "waterfall" effect to the eye of the observer is not understood. However, without being bound by the proposed theory, it is hypothesized that as each line of succeeding fields are painted on the face of the tube in next physical order, the eye tends to follow such lines thereby presenting an apparently moving image in either a vertically up or down direction depending upon the direction of motion or placement of the scanning line. The applicants' novel contribution to the art overcomes this problem as well as limiting the bandwidth requirements of the system.

For a better understanding of the present invention together with other and further objects thereof, reference is had to the following description of the preferred embodiment taken in connection with accompanying drawings, its scope is pointed out in the appended claims.

The drawings as well as the accompanying description are intended to be illustrative of the applicants' invention and in no way delimiting of its scope.

DESCRIPTION OF THE PREFERRED EMBODIMENT

Figure 1:
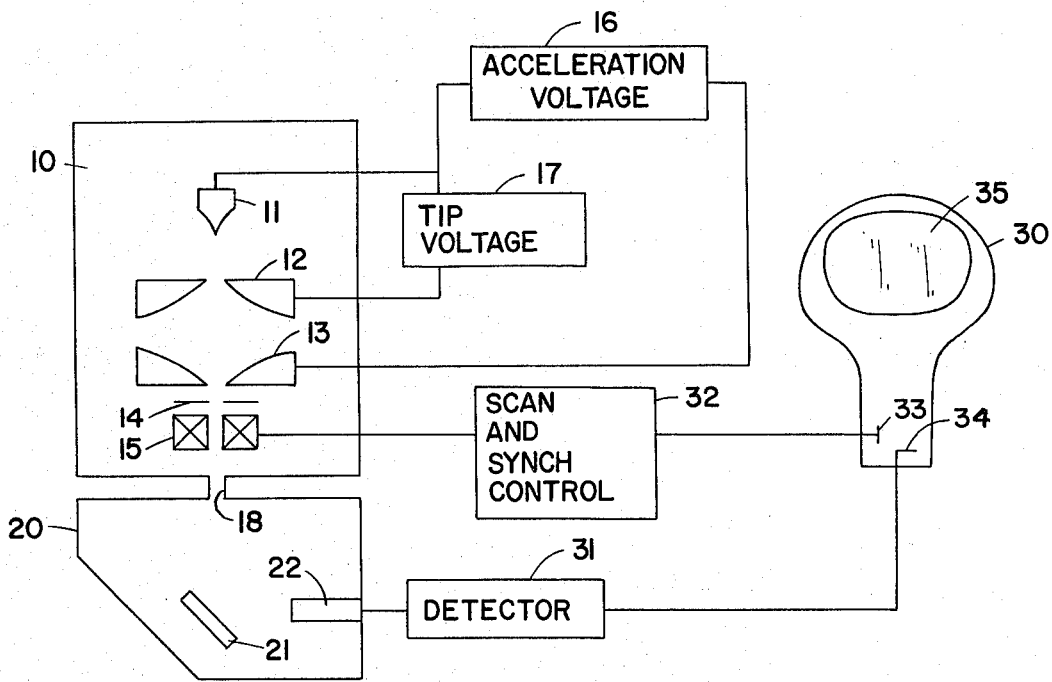
FIG. 1 is a diagrammatic-schematic view of a field emission scanning electron microscope display system.

The scanning miscroscopy display system of FIG. 1 operates a field emission electron gun 10 interconnected to a specimen chamber 20. The necessary operating voltages for electron gun 10 are supplied by tip voltage unit 17 and acceleration voltage unit 16. Scan and Sync control unit 32, detector unit 31, and the viewing tube monitor 30 comprise the remaining portion of the display system.

Field emission gun 10 is typical of those presently found in the art and reference may be had to an article appearing in "The Review Of Scientific Instruments," Volume 39, Number 4, April 1968 entitled ELECTRON GUN USING A FIELD EMISSION SOURCE, authors A. V. Crewe, D. N. Eggenberger, J. Wall, and L. M. Welter, for a more complete explanation of its operating characteristics and parameters. In further reference to this type of microscopy instrument, the applicants' co-pending application Ser. No. 46,425 filed June 15,1970, and now U. S. Pat. No. 3,678,333 entitled FIELD EMISSION ELECTRON GUN, which is hereby incorporated by reference, describes an improved scanning field emission microscope instrument. A field emission tip 11, which is a suitably shaped cathode of appropriate metal, and described in the aforementioned article, produces the beam of charged particles when placed in a sufficiently high electric field. In the scanning electron microscopy systems, the charged particles are of course electrons. However, in a field ion type device, the tip acts as a source of ions issuing from a virtual source within the structure of the field emission tip 11. Tip voltage unit 17 interconnected between field emission tip 11 and a first anode structure 12 supplies the necessary field gradient for production of the charged particles. The acceleration voltage unit 16 interconnected between field emission tip 11 and a second anode 13 further downstream provides the necessary acceleration forces and in conjunction with anode 12 focuses the particles to a desired beam size. This type of gun structure described essentially constitutes a self-focusing unit without need for further lensing systems unless peculiar resolution requirements are placed upon it. A beam aperture plate 14 shown distally located of the second anode 13 may be appropriately located in any number of positions in the gun and essentially determines the shape and size of the charged particle beam.

Since it is a scanning type device to which our attention is drawn, it is necessary that the charged particle beam be deflected in a predetermined pattern in order to appropriately scan the specimen undergoing ingestigation. Deflection coils 15 are driven by the scan and Sync control unit 32 to deflect the beam in the appropriate manner. In this system, the beam is scanned horizontally across the specimen, then rapidly returned to a starting point vertically displaced from the initial,and subsequent lines are then scanned in a similar manner. As the horizontal beam is swept across the specimen , it is continuously vertically displaced, thusly eventually covering the entire specimen surface. This type of scanning pattern is well known to those in the microscopy art and is entirely similar to that normally used in the transmission of television pictures.

The beam after deflection is passed through an interconnecting orifice 18 between gun 10 and specimen chamber 20. The specimen 21 is located in the physical path of the electron beam and is scanned in the manner heretofore described. Impingement of the beam upon the specimen 21 produces the emission of secondary particles,in the specific instance of this embodiment secondary electrons as well as reflected electrons which may be detected by unit 22. The sensing device 22 is of the scintillation type well known to those ordinarily skilled in the art and converts the signals derived from the specimen 21 to an amplified electrical signal upon which detector unit 31 may further operate. The sensing unit 22 in addition to the scintillator detector normally includes a photomultiplier or other similar element. The detector 31 further amplifies the signal and appropriately modifies it for operation with a viewing tube of the normal TV monitoring type. This detector means of the display system may then be thought of as incorporating sensing unit 22 as well as detector 31.

In the usual viewing tube 30, a viewing face 35 is provided having a sensitized surface which emits light upon the impingement of an electron beam. Normally, the sensitized surface is coated with a phosphor or other suitable material. The beam of the viewing tube is generated from a thermionic type cathode and deflected by electrostatic plates typically shown as 33 of viewing tube 30. If the image formed on the face of viewing tube 30 is to have coherency with the signals derived from the specimen 21, it is essential that a fixed and known relationship in both time and phase be maintained between the field emission gun 10 electron beam and the electron beam of viewing tube 30. Normally, it is found suitable to have both beams in exact synchromism with the signal produced by detector 31, thus producing a real time image of the specimen being investigated. As previously alluded to, advantage may be taken of viewing tube 30 face persistency as well as the persistency of the eye in limiting the bandwidth requirements of a viewing system. A complete vertical and horizontal sweep of the surface of a specimen is known as a field. If the field contains all of the horizontal scanning lines necessary to achieve system resolution, then the term "field" and "frame" are equivalent within a given system. However, in those instances where interlacing is used, i.e., each field contains only a portion of the total number of lines in the pattern, then a number of fields are required to make up or produce a complete frame. In the instance of a two-to-one interlace ratio, there are two fields per frame while in the case of a four-to-one ratio, there are four fields per frame. In this embodiment, a total of 1,155 scanning lines has been found adequate to achieve a 250 Angstrom resolution system. This means there are approximately 281 lines per field. The first field is painted by the tube beam on its sensitized face leaving a space equivalent to three lines between each succeeding line of the field. The next subsequent field paints a second line while the third and fourth fields fill in the remaining two lines of the pattern, thus after completion of four fields a complete picture having maximum resolution is obtained on the face of viewing tube 30. The Sync signals necessary to keep the scanning lines, both vertical and horizontal of viewing tube 30 and deflection coils 15, in exact phase relationship are incorporated into the output signals of the Scan and Sync control unit 32. The output signal of detector 31 applied to a signal grid 34 of viewing tube 30 modulates the electron beam of the tube and thereby affects the brightness and contrast of the image to produce a recognizable picture of specimen 21.

Figure 2:
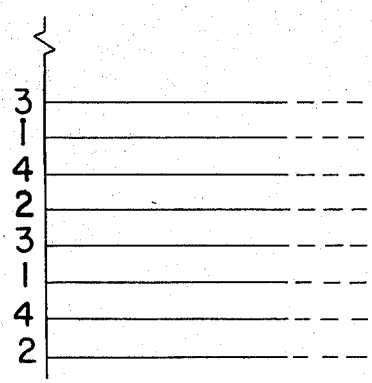
FIG. 2 is a partial diagrammatic representation of a viewing raster demonstrating the scanning pattern of the applicants' invention.
Figure 3:
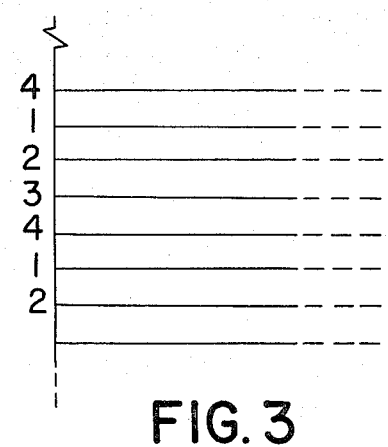
FIG. 3 is a partial diagrammatic representation of a viewing raster utilizing a normal scanning pattern having a four-to-one interlace ratio.

With reference to FIG. 3, there is shown a portion of a normal raster having a four-to-one interlace ratio. The numbers shown in FIG. 3 pertain to time sequencing or order of the fields making up a complete frame. In a normal display system, the second field lines are laid down in the next physical location on the face of tube 30. Each succeeding field is again laid down in the next available allocated line space and thus both the time sequencing and position order of the field lines are in phase. As previously indicated, it is just this order which produces in the eye of the observer a cascading or "waterfall" effect in the image. This effect is unduly wearisome to the observer and results in loss of effective resolution to the eye. The applicants have discovered that a physical interruption of the sequencing pattern of the scanning fields eliminates this cascade effect and produces a substantially stationary image to the eye of the observer. FIG. 2 demonstrates a sequencing pattern found to produce the desired results. The first field of the frame is laid down in a normal manner. The second field, however, is laid down in the position where the normal third field would be found, the third field is placed where the fourth field would normally be located and the fourth field is placed in the remaining slot or position of the raster. Stating this somewhat more succinctly, a normal field order would correspond to 1, 2, 3, 4, 1, et seq., while the raster of the applicants' display system would follow, for example, a pattern 1, 4, 2, 3, 1, et seq., thereby preventing any more than two succeeding field lines from appearing in the next physical order. Another pattern found appropriate to the applicants' purpose is 1, 3, 2, 4, and 1, et seq. The achieving of such horizontal scanning patterns is a rather complex electronic problem involving, however, only ordinary skill in the art. Teachings on this subject adequate to accomplishment of the purpose may be found in many texts, for example, "Pulse And Digital Circuits" by Jacob Millman and Herbert Taub, McGraw-Hill Electrical and Electronic Engineering Series, 1956, Chapter 17, entitled PULSE AND DIGITAL SYSTEMS. Of course, as the interlacing ratio is increased, the selection of scanning signals and their sequence is further complicated but again well within the ordinary skill of the art.

The applicants have thus provided a reliable low-cost field emission scanning microscopy display system having minimum bandwidth requirements and affording a substantially stationary image to the eye of the observer. It is intended that the embodiments described herein be illustrative of the invention and that those modifications apparent to one skilled in the art be included within the scope of the invention.

We claim:

1. In a scanning electron microscope comprising a charged particle gun for generating a beam of charged particles directed to impinge upon a specimen, scanning means to cause said beam to scan a surface of said specimen, detection means responsive to and providing an output proportional to charged particles leaving the surface of said specimen, display means responsive to said detection means for displaying an image of the charged particles detected by said detection means wherein the improvement comprises:

control means electrically connected to said scanning means adapted to cause said scanning means to scan said specimen surface in a field line pattern having at least a three-to-one interlacing;

interlacing control means in said control means to cause the interlacing order of said field lines to be other than sequential order;

display means including a cathode ray tube, the cathode ray of which is adapted to be modulated by said output of said detection means and deflected synchronously with said beam of charged particles whereby said beam of charged particles and said cathode ray are synchronized so as to scan said specimen and tube in lines which are uniformly non-sequentially interlaced from field-to-field which therefore, produces a high resolution picture substantially free of the phenomenon of cascade effect to the eye.

2. The improvement according to claim 1 wherein said charged particle gun includes a field emission tip, a first field anode and a second anode and said field and second anode form accelerating and focusing anodes for the electron beam generated by said field emission tip.

3. The improvement according to claim 2 including control means adapted to cause said scanning means to scan said specimen surface in an interlacing ratio of four-to-one and said interlacing control means inhibits the occurrence of more than two succeeding field lines in next succeeding adjacent locations in said scan pattern.

4. The improvement according to claim 3 wherein said interlacing control means is adapted for a sequence of 1, 4, 2, 3, and 1 et seq.

5. The improvement according to claim 3 wherein said interlacing control means is adapted for the sequence of 1, 3, 2, 4, and 1 et seq.

6. The improvement according to claim 1 wherein said detection means includes a scintillation type detector and photosensitive means for converting light produced by said scintillation detector to an electrical signal proportional thereto.

7. The improvement according to claim 1 wherein said charged particle gun is adapted to be an ion source including a field emission tip, a first field anode, a second anode, an ionizable gas disposed about said tip, and said field and second anode form accelerating and focusing anodes for the ions generated at said emission tip.

* * * * *